(12) United States Patent
Voogt (10) Patent No.: US 7,300,021 B2
(45) Date of Patent: Nov. 27, 2007

(54) AEROSPACE VEHICLE FAIRING SYSTEMS AND ASSOCIATED METHODS

(75) Inventor: Nicolaas Voogt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 11/134,019

(22) Filed: May 20, 2005

(65) Prior Publication Data

US 2006/0261217 A1    Nov. 23, 2006

(51) Int. Cl.
*B64C 3/38* (2006.01)

(52) U.S. Cl. .................................... 244/213

(58) Field of Classification Search ......... 244/213–216
See application file for complete search history.

(56) References Cited

U.S. PATENT DOCUMENTS

| | | |
|---|---|---|
| 1,724,456 A | 8/1929 | Crook |
| 1,770,575 A | 7/1930 | Ksoll |
| 2,086,085 A | 7/1937 | Lachmann et al. |
| 2,169,416 A | 8/1939 | Griswold |
| 2,282,516 A | 5/1942 | Hans et al. |
| 2,289,704 A | 7/1942 | Grant |
| 2,319,383 A | 5/1943 | Zap |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |

(Continued)

FOREIGN PATENT DOCUMENTS

DE              387833              1/1924

(Continued)

OTHER PUBLICATIONS

"Adaptive Aircraft: No Flight of Fancy?: Research into Using Exotic Means of Making Wings Change Shape In-Flight Looks Promising, Though Still a Long Way From Reality," Business Week On-Line, Jan. 7, 2003, pp. 1-3.

(Continued)

*Primary Examiner*—Tien Dinh
(74) *Attorney, Agent, or Firm*—Perkins Coie LLP (57) ABSTRACT

Aerospace vehicle fairing systems and associated methods, including fairings that house flap surface drive mechanisms on aircraft, are disclosed herein. One aspect of the invention is directed toward a fairing system that includes a fairing mounted to an airfoil. The fairing can have a longitudinal axis and a fairing section extending along the longitudinal axis forward and aft of a trailing edge portion of an airfoil section. In one embodiment of the invention, the fairing section can have a wide portion located aft of the airfoil section with a single spanwise width that is greater than or equal to a spanwise width of any other portion of the fairing section. In another embodiment of the invention the fairing section can have a first side and a second side, each with a point of maximum curvature. At least one point of maximum curvature can be located aft of the airfoil section.

8 Claims, 5 Drawing Sheets

U.S. PATENT DOCUMENTS

| | | |
|---|---|---|
| 2,458,900 A | 1/1949 | Emy |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer at al. |
| 2,891,740 A | 6/1959 | Campbell |
| 2,892,312 A | 6/1959 | James et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Domier |
| 3,136,504 A | 6/1964 | Carr |
| 3,166,271 A | 1/1965 | Zuck |
| 3,203,647 A | 8/1965 | Alvarez-Calderon |
| 3,282,535 A | 11/1966 | Steiner |
| 3,375,998 A | 4/1968 | Alvarez-Calderon |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neil et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier |
| 3,968,946 A | 7/1976 | Cole |
| 3,985,319 A | 10/1976 | Dean et al. |
| 3,987,983 A | 10/1976 | Cole |
| 3,992,979 A | 11/1976 | Smith |
| 3,993,584 A | 11/1976 | Owen et al. |
| 3,994,451 A | 11/1976 | Cole |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | Mc Kinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo |
| 4,384,693 A | 5/1983 | Pauly et al. |
| 4,427,168 A | 1/1984 | McKinney |
| 4,441,675 A | 4/1984 | Boehringer |
| 4,444,368 A | 4/1984 | Andrews |
| 4,461,449 A | 7/1984 | Turner |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker et al. |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,637,573 A | 1/1987 | Perin et al. |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,706,913 A | 11/1987 | Cole |
| 4,712,752 A | 12/1987 | Victor |
| 4,717,097 A | 1/1988 | Sepstrup |
| 4,729,528 A | 3/1988 | Borzachillo |
| 4,747,375 A | 5/1988 | Williams |
| 4,784,355 A | 11/1988 | Brine |
| 4,786,013 A | 11/1988 | Pohl |
| 4,789,119 A | 12/1988 | Bellego et al. |
| 4,796,192 A | 1/1989 | Lewis |
| 4,823,836 A | 4/1989 | Bachmann et al. |
| 4,838,503 A | 6/1989 | Williams et al. |
| 4,854,528 A * | 8/1989 | Hofrichter .................. 244/215 |
| 4,856,735 A | 8/1989 | Lotz et al. |
| 4,867,394 A * | 9/1989 | Patterson, Jr. ................ 244/54 |
| 4,892,274 A * | 1/1990 | Pohl et al. ................... 244/213 |
| 4,899,284 A | 2/1990 | Lewis |
| 4,962,902 A | 10/1990 | Fortes |
| 5,039,032 A | 8/1991 | Rudolph |
| 5,046,688 A | 9/1991 | Woods |
| 5,050,081 A | 9/1991 | Abbott et al. |
| 5,056,741 A | 10/1991 | Bliesner et al. |
| 5,074,495 A | 12/1991 | Raymond |

| | | |
|---|---|---|
| 5,082,207 A | 1/1992 | Tulinius |
| 5,082,208 A | 1/1992 | Matich |
| 5,088,665 A | 2/1992 | Vijgen |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,244,269 A | 9/1993 | Harriehausen |
| 5,259,293 A | 11/1993 | Brunner |
| 5,280,863 A | 1/1994 | Schmittle |
| 5,282,591 A | 2/1994 | Walters et al. |
| 5,351,914 A | 10/1994 | Nagao |
| 5,388,788 A | 2/1995 | Rudolph |
| 5,441,218 A | 8/1995 | Mueller |
| 5,474,265 A | 12/1995 | Capbern |
| 5,493,497 A | 2/1996 | Buus |
| 5,535,852 A | 7/1996 | Bishop |
| 5,542,684 A | 8/1996 | Squirrell |
| 5,544,847 A | 8/1996 | Bliesner |
| 5,600,220 A | 2/1997 | Thoraval |
| 5,609,020 A | 3/1997 | Jackson |
| 5,680,124 A | 10/1997 | Bedell |
| 5,681,014 A | 10/1997 | Palmer |
| 5,686,907 A | 11/1997 | Bedell |
| 5,735,485 A | 4/1998 | Ciprian et al. |
| 5,740,991 A | 4/1998 | Gleine et al. |
| 5,743,490 A | 4/1998 | Gillingham |
| 5,788,190 A | 8/1998 | Siers |
| 5,839,698 A | 11/1998 | Moppert |
| 5,875,998 A | 3/1999 | Gleine |
| 5,921,506 A | 7/1999 | Appa |
| 5,927,656 A | 7/1999 | Hinkleman |
| 5,934,615 A | 8/1999 | Treichler |
| 5,984,230 A | 11/1999 | Orazi |
| 6,015,117 A | 1/2000 | Broadbent |
| 6,033,180 A | 3/2000 | Machida et al. |
| 6,045,204 A | 4/2000 | Frazier |
| 6,073,624 A | 6/2000 | Laurent |
| 6,076,767 A | 6/2000 | Farley et al. |
| 6,076,776 A | 6/2000 | Breitbach |
| 6,079,672 A | 6/2000 | Lam et al. |
| 6,082,679 A | 7/2000 | Crouch et al. |
| 6,109,567 A | 8/2000 | Munoz |
| 6,152,405 A | 11/2000 | Muller et al. |
| 6,161,801 A | 12/2000 | Kelm |
| 6,164,598 A | 12/2000 | Young et al. |
| 6,173,924 B1 | 1/2001 | Young et al. |
| 6,189,837 B1 | 2/2001 | Matthews |
| 6,213,433 B1 | 4/2001 | Gruensfelder |
| 6,227,498 B1 | 5/2001 | Arata |
| 6,244,542 B1 | 6/2001 | Young et al. |
| 6,293,497 B1 | 9/2001 | Wickemeyer et al. |
| 6,328,265 B1 | 12/2001 | Dizdarevic |
| 6,349,798 B1 | 2/2002 | McKay |
| 6,349,903 B2 | 2/2002 | Caton et al. |
| 6,364,254 B1 | 4/2002 | May |
| 6,375,126 B1 | 4/2002 | Sakurai |
| 6,382,566 B1 | 5/2002 | Ferrel et al. |
| 6,431,498 B1 | 8/2002 | Watts et al. |
| 6,439,512 B1 | 8/2002 | Hart |
| 6,443,394 B1 | 9/2002 | Weisend |
| 6,450,457 B1 | 9/2002 | Sharp |
| 6,464,175 B2 | 10/2002 | Yada et al. |
| 6,466,141 B1 | 10/2002 | McKay et al. |
| 6,478,541 B1 | 11/2002 | Charles et al. |
| 6,481,667 B1 | 11/2002 | Ho |
| 6,484,969 B2 | 11/2002 | Sprenger |
| 6,499,577 B2 | 12/2002 | Kitamoto et al. |
| 6,536,714 B2 | 3/2003 | Gleine et al. |
| 6,547,183 B2 | 4/2003 | Farnsworth |
| 6,554,229 B1 | 4/2003 | Lam |
| 6,561,463 B1 | 5/2003 | Yount et al. |
| 6,591,169 B2 | 7/2003 | Jones |
| 6,598,829 B2 | 7/2003 | Kamstra |
| 6,598,834 B2 | 7/2003 | Nettle |
| 6,601,801 B1 | 8/2003 | Prow |
| 6,622,972 B2 | 9/2003 | Urnes, Sr. et al. |
| 6,622,974 B1 | 9/2003 | Dockter et al. |
| 6,625,982 B2 | 9/2003 | Van Den Bossche |
| 6,644,599 B2 | 11/2003 | Perez |
| 6,651,930 B1 | 11/2003 | Gautier et al. |
| 6,729,583 B2 | 5/2004 | Milliere et al. |
| 6,755,375 B2 | 6/2004 | Trikha |
| 6,796,526 B2 | 9/2004 | Boehringer |
| 6,796,534 B2 | 9/2004 | Beyer et al. |
| 6,799,739 B1 | 10/2004 | Jones |
| 6,802,475 B2 | 10/2004 | Davies et al. |
| 6,824,099 B1 | 11/2004 | Jones |
| 6,843,452 B1 | 1/2005 | Vassberg et al. |
| 6,870,490 B2 | 3/2005 | Sherry et al. |
| 6,978,971 B1 | 12/2005 | Dun |
| 7,028,948 B2 | 4/2006 | Pitt |
| 7,048,228 B2 | 5/2006 | Vassberg et al. |
| 7,048,234 B2 | 5/2006 | Reeksiek et al. |
| 7,048,235 B2 | 5/2006 | McLean et al. |
| 7,051,982 B1 | 5/2006 | Johnson |
| 7,059,563 B2 | 6/2006 | Huynh |
| 2003/0132860 A1 | 7/2003 | Feyereisen |
| 2003/0197097 A1 | 10/2003 | Wakayama |
| 2004/0004162 A1 | 1/2004 | Beyer |
| 2004/0059474 A1 | 3/2004 | Boorman |
| 2004/0245386 A1 | 12/2004 | Huynh |
| 2005/0011994 A1 | 1/2005 | Sakurai et al. |
| 2005/0017126 A1 | 1/2005 | McLean et al. |
| 2005/0061922 A1 | 3/2005 | Milliere |
| 2005/0151028 A1 | 7/2005 | Pohl et al. |
| 2005/0242234 A1 | 11/2005 | Mahmulyin |
| 2005/0274847 A1 | 12/2005 | Charron |
| 2006/0038086 A1 | 2/2006 | Reckzeh |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 483 504 A1 | 5/1992 |
| EP | 0781704 A1 | 2/1997 |
| EP | 0 947 421 | 10/1999 |
| EP | 1 010 616 A2 | 6/2000 |
| EP | 1338506 | 8/2003 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| GB | 1 181 991 | 2/1970 |
| GB | 2 144 688 A | 3/1985 |

OTHER PUBLICATIONS

"Aero-Space Research & Technology," Space Systems, Sep. 1, 2001, pp. 1-28.

"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%2Baircraft%29&oldid=67413665>.

"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.

Leaf Spring Retainer Seals; EMP, Inc.; 2 pgs.

Morphing Aircraft Structures, "Morphing Aircraft Structures-Raytheon," <<http://www.defense-update.com/products/m/morphing-structures.htm>>, pp. 1-3, [Accessed Aug. 31, 2005].

Morphing Aircraft Structures, "Morphing Aircraft Structures-The Cellular Approach," <http://www.personal.psu.edu/users/d/s/dsr134/mas/Cellular.htm>, Penn State University, pp. 1-3 [Accessed Aug. 31, 2005].

Morphing Systems, "Morphing Aerostructures-An Overview," <http://www.crgrp.net/morphingsystems.htm>, 7 Pages, [Accessed Aug. 31, 2005].

PCT International Search Report and Written Opinion for PCT/US2006/016002; The Boeing Company; Sep. 4, 2006; 11 pgs; European Patent Office.

U.S. Appl. No. 10/671,435, Kelley-Wickemeyer et al.
U.S. Appl. No. 10/770,256, Speer et al.
U.S. Appl. No. 10/789,100, Lacy et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones et al.
U.S. Appl. No. 11/048,320, Konings et al.
U.S. Appl. No. 11/051,738, Huynh et al.
U.S. Appl. No. 11/116,905, Good et al.

777 High Lift System, 777 Maintenance Manual, Publication Date: Circa 1994 (1 Page).

777 Transmission—Typical, 777 Maintenance Manual, Publication Date: Circa 1994 (1 page).

A320 Hinterkantem-Klappen-Verstell System, Trailing Edge Flap System, SAE Presentation, Publication Date: Circa 1990 (1 page).

A340 Flight Controls, SAE Presentation, Publication Date: Circa 1995 (1 page).

Boeing, 777 Aircraft Maintenance Manual, Sep. 5, 2002 (p. 39).

Drela, M., "Optimization Techniques in Airfoil Design," MIT Aero & Astro, 29 pages.

Drela, Mark, "Design and Optimization Method for Multi-Element Airfoils," MIT Department of Aeronautics and Astronautics, Copyright 1993 American Institute of Aeronautics and Astronautics, Inc. (pp. 1-11).

Flap Drive System, 777 Maintenance Manual, Publication Date: Circa 1994 (1 page).

Flap Transmission and Support, 777 Maintenance Manual, Publication Date: Circa 1994 (1 page).

Hansen, H., "Application of Mini-Trailing-Edge Devices in the Awiator Project," Airbus Deutschland, EGAG, Hunefeldstr. 1-5, D-28199 Bremen, Germany, 9 pages.

Junkers JU 52/3M (2 pages); http://www.wpafb.af.mil/museum/outdoor/od16; [Accessed Aug. 7, 2003].

Moog, Component Maintenance Manual, May 1994 (2 pages).

Niu, Chen-Yen, Airframe Structural Design, Chen-Yeun Niu, Conmilit Press, 1988 (1 page).

Petrov, A.V., "Certain Types of Separated Flow over Slotted Wings," Fluid Mechanics—Soviet Research, vol. 7, No. 5, Sep.-Oct. 1978, pp. 80-89.

U.S. Appl. No. 60/475,828, Borzachillo.

The High Speed Frontier, Chapter 2: The High-Speed Airfoil Program, "Supercritical" Airfoils, 1957-1978 (4 pages); http://www.hq.nasa.gov/office/pao/History/SP-445/ch2-5.

TU-144 Canard, 1 pg, (date unknown).

Whitcomb, Richard T., "Review of NASA Supercritical Airfoils," National Aeornautics and Space Administration, Aug. 1974 (pp. 8-18).

* cited by examiner

AEROSPACE VEHICLE FAIRING SYSTEMS AND ASSOCIATED METHODS

TECHNICAL FIELD

Embodiments of the present invention relate to aerospace vehicle fairing systems and associated methods, including fairings that house flap surface drive mechanisms on aircraft.

BACKGROUND

Modern high-speed aircraft generally have thin wings that provide a low drag profile during high-speed or cruise flight. The wings of these aircraft often include various movable surfaces to provide aircraft control and/or to configure the aircraft for low-speed operations (e.g., takeoff and landing). For example, in addition to carrying fuel, the wings of a high-speed transport aircraft typically included aileron surfaces, spoiler surfaces, leading edge device surfaces, and trailing edge flap surfaces. These movable surfaces are often located at or near the leading and trailing edges of the wing where the wing is too thin to fully enclose the support structure and/or drive mechanisms required to operate these surfaces. Accordingly, fairings are often mounted on the wing to house portions of the drive mechanisms and/or support structure that cannot be enclosed in the wing. These fairings are generally streamlined to have a low drag profile during high-speed or cruise flight.

Figure 1:
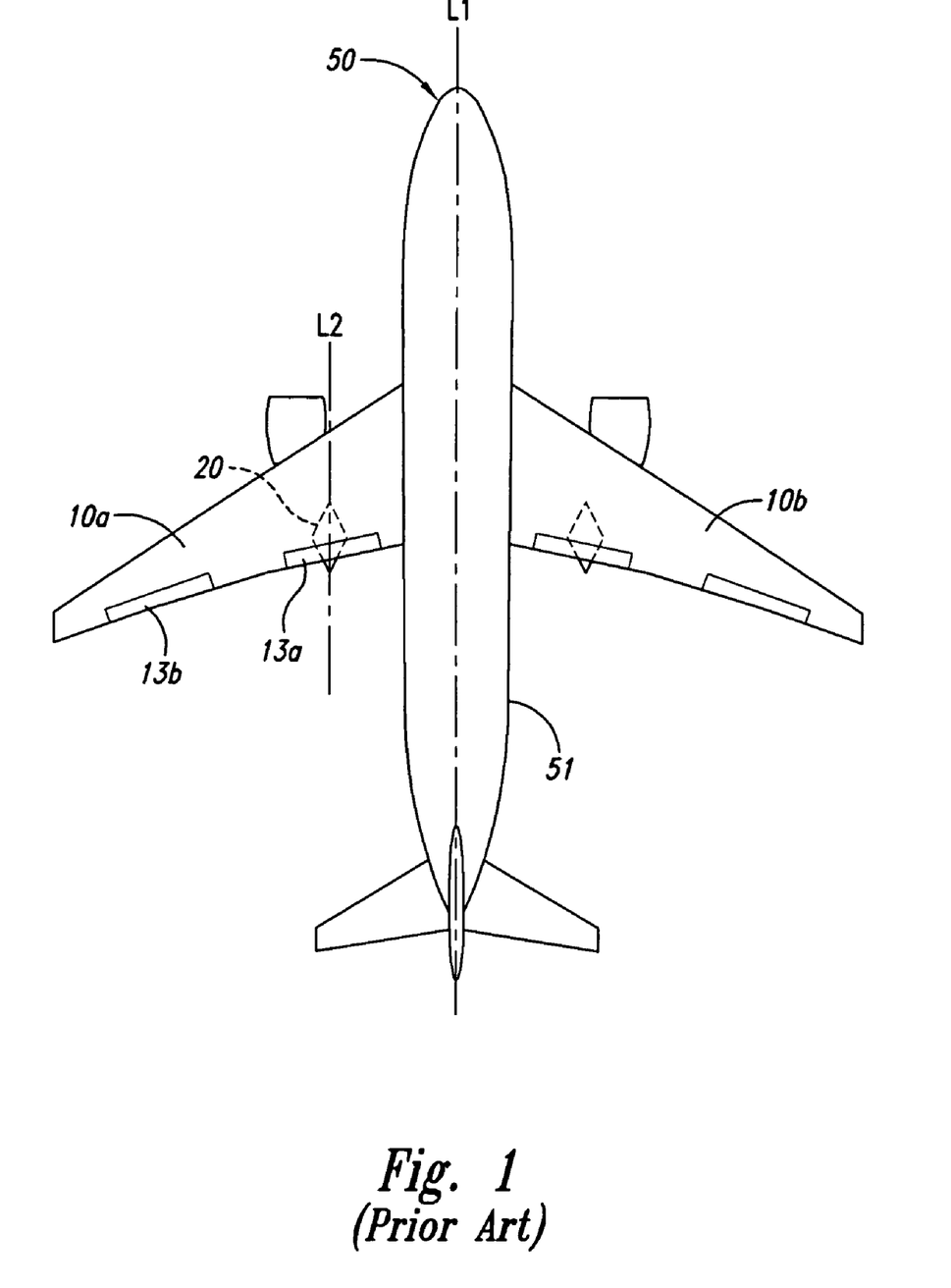
FIG. 1 is a partially schematic illustration of an aircraft with a flap fairing in accordance with the prior art.

FIG. 1 is a partially schematic illustration of a transport aircraft 50 having a fuselage 51 with a longitudinal axis L1, a first wing 10a, and a second wing 10b in accordance with the prior art. The first wing includes a movable flap surface 13a and a movable aileron surface 13b. A fairing 20 is mounted on the underside of the first wing 10a to house portions of a support structure and a drive mechanism that are required to operate the flap 13a. The fairing has a longitudinal axis L2 that is at least approximately parallel to the longitudinal axis L1 of the fuselage 51. The fairing 20 has a streamlined planform (e.g., when viewed from the top of the wing) where the widest part relative to the longitudinal axis L2 of the fairing is entirely forward of the trailing edge of the airfoil (e.g., entirely forward of the trailing edge of the flap 13a). However, even these fairings create drag on the aircraft.

SUMMARY

The present invention is directed generally toward aerospace vehicle fairing systems and associated methods, including fairings that house flap surface drive mechanisms on aircraft. Aspects of the invention are directed toward a fairing system that includes an airfoil having an airfoil section with a trailing edge portion. The system further includes a fairing mounted to the airfoil section. The fairing can have a longitudinal axis and a fairing section extending along the longitudinal axis forward and aft of the trailing edge portion of the airfoil section. The airfoil section can correspond to a planform projection of a segment of the fairing section on the airfoil. The fairing section can have a wide portion, with at least part of the wide portion located aft of the airfoil section. The wide portion of the fairing section can have a single spanwise width measured perpendicular to the longitudinal axis of the fairing that is greater than or equal to a spanwise width of any other portion of the fairing section.

Other aspects of the invention are directed toward a fairing system that includes an airfoil having an airfoil section with a trailing edge portion. The system can further include a fairing mounted to the airfoil section. The fairing can have a longitudinal axis and a fairing section extending along the longitudinal axis forward and aft of the trailing edge portion of the airfoil section. The airfoil section can correspond to a planform projection of a segment of the fairing section on the airfoil. The fairing section can have a first side and a second side. Each side can be laterally displaced from the longitudinal axis. Each side can have a point of maximum curvature. The point of maximum curvature for at least one of the first and second sides can be located aft of the airfoil section.

Still other aspects of the invention are directed toward a method for making a fairing system that includes locating a fairing proximate to an airfoil. The airfoil can have a trailing edge and an airfoil section with a trailing edge portion. A section of the fairing can extend along a longitudinal axis of the fairing forward and aft of the trailing edge portion of the airfoil section. The airfoil section can correspond to a planform projection of a segment of the faring section on the airfoil. The method can further include mounting the fairing to the airfoil so that: (a) at least part of a wide portion of the fairing section is located aft of the airfoil section; (b) a point of maximum curvature for at least one of a first side and a second sides is located aft of the airfoil section; or (c) both (a) and (b). The wide portion of the fairing section can have a single spanwise width measured perpendicular to the longitudinal axis of the fairing that is greater than or equal to a spanwise width of any other portion of the fairing section. The first side and the second side can each be laterally displaced from the longitudinal axis.

DETAILED DESCRIPTION

The present disclosure describes aerospace vehicle fairing systems and associated methods, including fairings that house flap surface drive mechanisms on aircraft. Several specific details of the invention are set forth in the following description and in FIGS. 2-7 to provide a thorough understanding of certain embodiments of the invention. One skilled in the art, however, will understand that the present invention may have additional embodiments, and that other embodiments of the invention may be practiced without several of the specific features described below.

Figure 2:
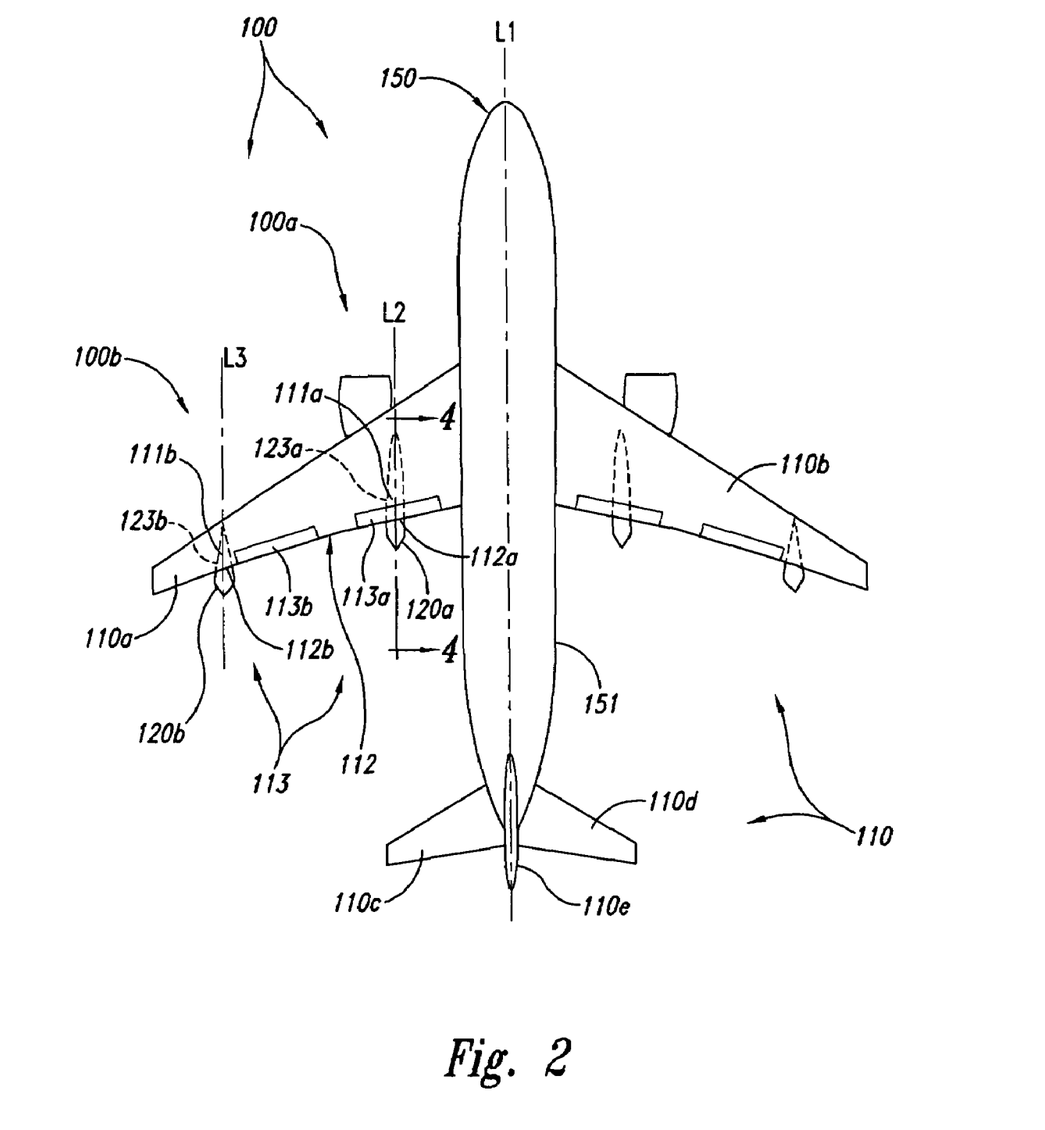
FIG. 2 is a partially schematic illustration of an aerospace vehicle with a first fairing system and a second fairing system, where each fairing system is in accordance with embodiments of the invention.

FIG. 2 illustrates an aerospace vehicle 150 having a first fairing system 100a and a second fairing system 100b, where each fairing system 100 is in accordance with embodiments of the invention. In some embodiments these fairing systems can reduce interference drag and/or increase lift over that of current fairings used on various aircraft. Features of the first fairing system are discussed in further detail with reference to FIGS. 3-6. Features of the second fairing system are discussed in further detail with reference to FIG. 7.

In the embodiment shown in FIG. 2, the aerospace vehicle 150 has a longitudinal axis L1 that runs through a fuselage 151 (e.g., through the forward tip and aft tip of the fuselage). The aerospace vehicle 150 also has multiple airfoils 110 coupled to the fuselage 151, including a first airfoil 110a (e.g., a left wing), a second airfoil 110b (e.g., a right wing), a third airfoil 110c (e.g., a left horizontal tail), a fourth airfoil 110d (e.g., a right horizontal tail), and a fifth airfoil 110e (e.g., a vertical stabilizer). In other embodiments, the aerospace vehicle 150 can have other arrangements including more or fewer fuselages 151, more or fewer airfoils 110, and/or other arrangements of airfoils 110 coupled to the aerospace vehicle and/or fuselage(s) 151.

In the illustrated embodiment, the first airfoil 110a includes a trailing edge 112 and two movable surfaces 113, shown as a first movable surface 113a configured as a flap surface and a second movable surface 113b configured as an aileron surface. In other embodiments, the first airfoil 110a can include more, fewer, or other types of movable surfaces 113. The first fairing system 100a can include a first fairing 120a having a longitudinal axis L2 that is at least approximately parallel to the longitudinal axis L1 of the aerospace vehicle 150. The first fairing 120a can be mounted to the first airfoil 110a so that a first section 111a of the first airfoil 110a corresponds to a planform projection of the first segment 123a of the first fairing 120a on the airfoil. The second fairing system 100b can include a second fairing 120b having a longitudinal axis L3 that is at least approximately parallel to the longitudinal axis of the aerospace vehicle 150. The second fairing can also be mounted to the first airfoil 110a so that a second section 111b of the first airfoil 110a corresponds to a planform projection of the second segment 123b of the second fairing sections 120a on the airfoil. The first airfoil section 111a can include a first trailing edge portion 112a and the second airfoil section 111b can include a second trailing edge portion 112b.

In FIG. 2, the first airfoil section 111a includes a portion of the first movable surface 113a. The first movable surface 113a is located such that a portion of the trailing edge of the first movable surface 113a makes up at least a part of the first trailing edge portion 112a. Accordingly, at least a part of the first trailing edge portion 112a is movable between at least two positions (e.g., a retracted position and an extended position). In the illustrated embodiment, the first airfoil section 111a includes a first trailing edge portion 112a that moves as a single unit. In other embodiments, the first trailing edge portion can have other arrangements, including a first trailing edge portion 112a that has movable and fixed parts and/or multiple parts that move independently of one another.

Figure 3:
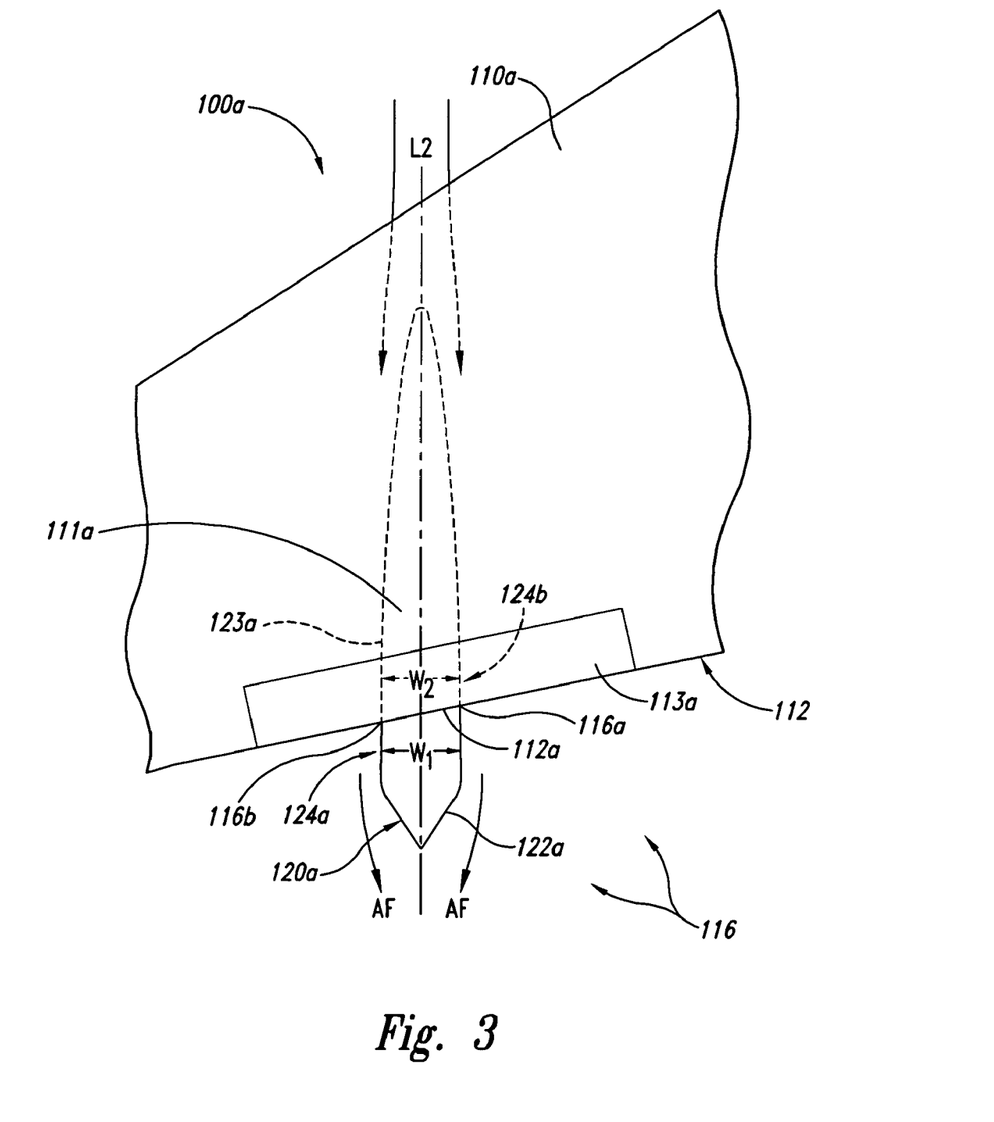
FIG. 3 is a partially schematic enlarged view of the first fairing system shown in FIG. 2.

FIG. 3 is a partially schematic enlarged view of the first fairing system 100a shown in FIG. 2. In the illustrated embodiment, the first fairing 120a is mounted to the underside of the first airfoil 110a. For example, the first fairing section 120a can be attached to the first airfoil 110a after the first airfoil has been produced and/or fabricated onto/into the first airfoil 110a during the production process (e.g., to form a protrusion from the airfoil shape). In other embodiments, the first fairing 120a can be mounted to other portions of the first airfoil 110a. For example, the first fairing can be mounted to the top of the airfoil 110a or can be mounted to opposing surfaces of an airfoil (e.g., mounted to the left and right surfaces of a vertically oriented airfoil or to the top and bottom surfaces of a horizontally oriented airfoil). The trailing edge 112 of the first airfoil 110a can include adjacent trailing edge points 116, where the adjacent trailing edge points 116 are points on the trailing edge 112 of the first airfoil 110a immediately adjacent to the first fairing 120a. In the illustrated embodiment, two adjacent trailing edge points 116 are shown as a first adjacent trailing edge point 116a and a second adjacent trailing edge point 116b.

In the illustrated embodiment, the first fairing 120a has a first fairing section 122a that extends along the longitudinal axis L2 forward and aft of the first trailing edge portion 112a of the first airfoil section 111a. In FIG. 3, the first fairing section 122a includes the entire first fairing 120a. In other embodiments, the first fairing section 122a does not include the entire first fairing 120a.

In FIG. 3, the first fairing section 122a has a wide portion 124a that has a single spanwise planform width W1 measured perpendicular to the longitudinal axis of the first fairing 120a that is greater than or equal to a spanwise width of any other portion of the first fairing section 122a. At least part of the wide portion 124a of the first fairing section 120a can be located aft of the first airfoil section 111a and/or aft of at least one of the first and second adjacent trailing edge points 116a, 116b. For example, in the illustrated embodiment a second spanwise portion 124b of the first fairing section 122a, located forward of the first trailing edge portion 112a of the of the first airfoil section 111a and forward of the first and second adjacent trailing edge points 116a, 116b, has a width W2 that is equal to the width W1 of the wide portion 124a, but the first fairing section 122a does not have any portion with a width that is greater than the width W1 of the wide portion 124a.

It has been discovered that in certain embodiments, locating at least part of the wide portion 124a of the first fairing section 122a aft of the first airfoil section 111a and/or aft of at least one of the first and second adjacent trailing edge points 116a, 116b can affect the airflow proximate to the first fairing section 122a, resulting in a drag reduction and/or a lift increase over that of airfoils having current fairings. It is thought that one factor contributing to this phenomenon is the placement of a low pressure area proximate to the trailing edge of an airfoil. For example, when the aerospace vehicle 150 is operated in a selected configuration (e.g., with the first movable surface 113a retracted) and at certain operating conditions (e.g., at low-drag, high-speed, and/or cruise conditions), the variation in width along the longitudinal axis of the first fairing 120a can cause fluid or air flowing proximate to the first fairing 120a to be accelerated as the fairing increases in width (e.g. as shown schematically by the airflow arrows AF in FIG. 3). As the airflow accelerates, the local or static pressure can decrease. By placing at least part of the wide portion 124a of the first fairing section 122a aft of the first airfoil section 111a and/or aft of at least one of the first and second adjacent trailing edge points 116a, 116b, an area of lower pressure proximate to the first fairing section 122a and the trailing edge of the first airfoil 110a can be positioned to provide a favorable pressure gradient with respect to drag and/or lift as compared to current fairings. An advantage of decreasing drag and/or increasing lift is that aircraft performance can be improved, for example, by reducing fuel burn and thereby increasing range and/or decreasing operating costs over aircraft having current fairings.

Figure 4:
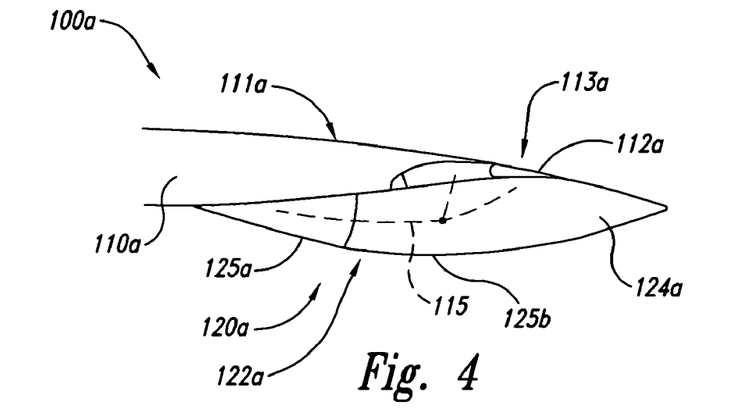
FIG. 4 is a partially schematic cross-sectional view of the first fairing system shown in FIG. 2 taken along line 4-4 with a first movable surface in a first position.
Figure 5:
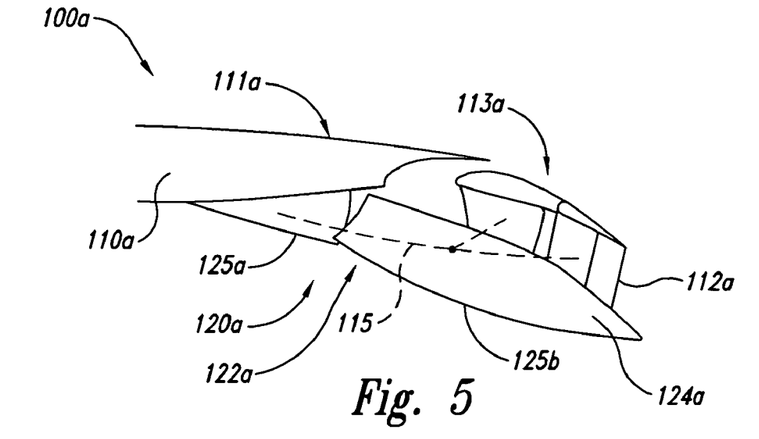
FIG. 5 is a partially schematic cross-sectional view of the first fairing system shown in FIG. 4 with the first movable surface in a second position.
Figure 6:
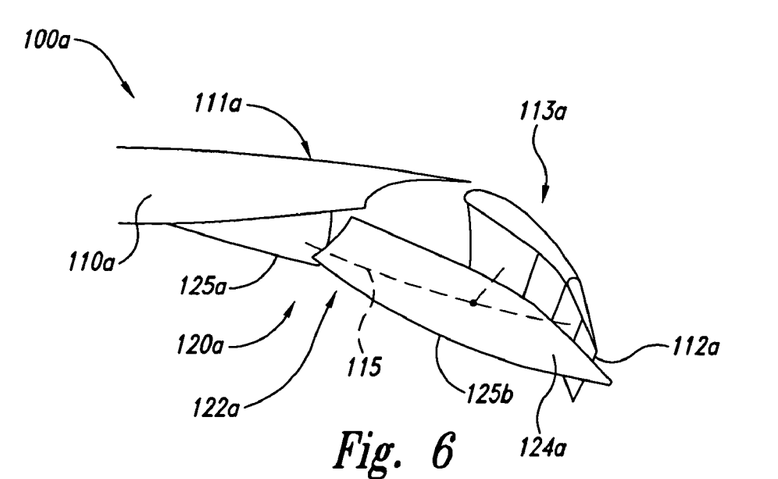
FIG. 6 is a partially schematic cross-sectional view of the first fairing system shown in FIG. 4 with the first movable surface in a third position.

In certain embodiments, where at least part of the first trailing edge portion 112a of the airfoil section 111a is movable, the wide portion 124a of the fairing section 122a is located aft of the airfoil section 111b and/or aft of at least one of the first and second adjacent trailing edge points 116a, 116b only when the part of the first trailing edge portion 112a is in a selected position, as shown in FIGS. 4-6. FIG. 4 is a partially schematic cross-sectional view of the first fairing system 100a shown in FIG. 2 taken along line 4-4 with the first movable surface 113a in a first position. For example, the first movable surface 113a in a first position can include a flap surface in a retracted position typically used for cruise, low-drag operations, and/or high-speed operations. In the illustrated embodiment, the first position is a selected position where at least part of the wide portion 124a of the fairing section 122a is positioned aft of the airfoil section 111a and/or aft of at least one of the first and second adjacent trailing edge points 116a, 116b, as described above. In FIG. 4, the first fairing houses a drive mechanism 115 and the associated supports required to support and move the first movable surface 113a. Additionally, the first fairing 120a includes multiple pieces, shown as a first piece 125a and a second piece 125b. The first and second pieces 125a, 125b are configured to move relative to one another as the first movable surface 113a is moved.

In other embodiments, the first fairing system 100a can have other arrangements, including more or fewer pieces and/or the fairing can house other components (e.g., other aerospace vehicle system components) or no components. Additionally, although in the illustrated embodiment the first fairing system 100a includes a portion of a single movable surface, in other embodiments the first fairing system 100a can include portions of multiple movable surfaces (e.g., the first fairing system 100a can be positioned to include a portion of two flap surfaces). In still other embodiments, multiple fairing systems 100 can include portions of the same movable surface, for example, multiple fairing systems 100 can house multiple drive mechanisms for a single movable surface (e.g., drive mechanisms to drive a single flap surface).

FIG. 5 is a partially schematic cross-sectional view of the first fairing system 100a shown in FIG. 4 where the first movable surface 113a has been placed in a second position (e.g., a flap in a first extended position). In FIG. 6, the first movable surface 113a has been placed in a third position (e.g., a second extended position). In the illustrated embodiment, when the first movable surface 113a is in the second position (FIG. 5) or a third position (FIG. 6), the wide portion 124a of the fairing section 122a can be forward of the first trailing edge portion 112a of the first airfoil section 111a and/or forward of the first and second adjacent trailing edge points, discussed above with reference to FIG. 3. For example, the first movable surface 113a can include a flap surface that can be placed in a first extended position (FIG. 5) or a second extended position (FIG. 6) during low-speed operations where a low-drag profile can be less important than when the first movable surface 113a is in the selected position (e.g., the retracted position).

Figure 7:
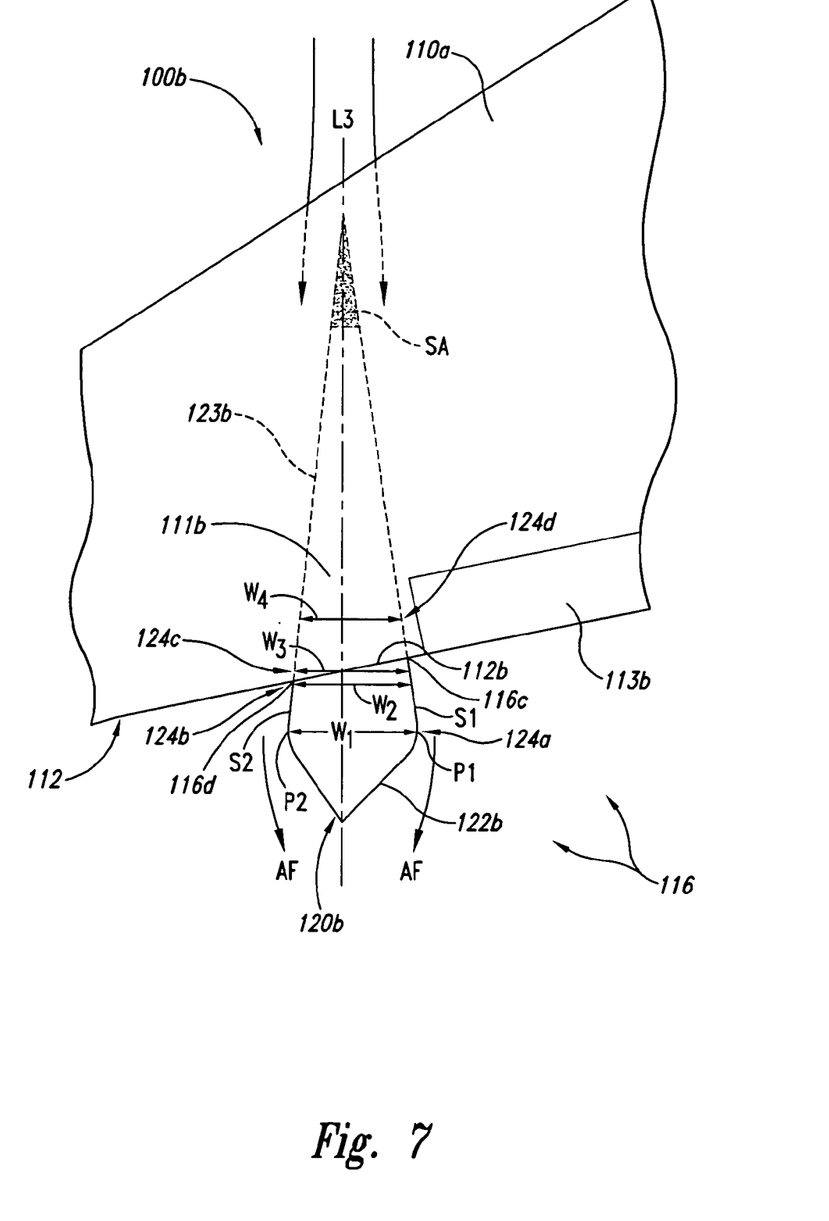
FIG. 7 is a partially schematic enlarged view of the second fairing system shown in FIG. 2.

FIG. 7 is a partially schematic enlarged view of the second fairing system 100b shown in FIG. 2. In the illustrated embodiment the second fairing 120b is mounted to the underside of the first airfoil 110a. The second fairing 120b has a second fairing section 122b that extends along the longitudinal axis L3 forward and aft of the second trailing edge portion 112b of the second airfoil section 111b. In FIG. 7, the second fairing section 122b is asymmetrical with respect to the longitudinal axis L3 of the second fairing 120b. In other embodiments, the second fairing section 122b can be symmetrical about the longitudinal axis L3 of the second fairing 120b. Additionally, in the illustrated embodiment the second fairing section 122b includes only a portion of the entire second fairing 120b (e.g., the second fairing section 122b does not include the shaded area SA of the second fairing 120b shown in FIG. 7). Additionally, in the illustrated embodiment the trailing edge 112 of the first airfoil 110a includes a third adjacent trailing edge point 116c and a fourth adjacent trailing edge point 116d that are immediately adjacent to the second fairing 120b.

In the illustrated embodiment, the second fairing section 122b includes a first side S1 and a second side S2 facing in generally lateral directions. The first and second sides S1, S2 can include the farthest points laterally from the longitudinal axis L3 of the second fairing 120b. The width of the second fairing section 122b increases in an aft direction along the longitudinal axis L3 until reaching a widest portion and then decreases. Accordingly, the second fairing section 122b includes multiple portions 124, with each portion having a single width. For example, four of the multiple portions 124 are identified in FIG. 7 as a first portion 124a having a first width W1, a second portion 124b having a second width W2, a third portion 124c having a third width W3, and a fourth portion 124d having a fourth width W4.

In FIG. 7, the fourth portion 124d is located forward of the second trailing edge portion 112b of the second airfoil section 111b and forward of the third and fourth adjacent trailing edge points 116c, 116d. The fourth portion 124d has a fourth width W4 that is smaller than the first, second, and third widths W1, W2, W3. At least part of the third portion 124c is located aft of the second airfoil section 111b (e.g., aft of the second trailing edge portion 112b) and aft of the third adjacent trailing edge point 116c. The third portion 124c has a third width W3 that is greater than the fourth width W4, but smaller than the first and second widths W1, W2. Additionally, the third portion 124c has a width that is larger than or equal to the width of any portion 124 that is forward of the third portion 124c.

The entire second portion 124b is located aft of the second airfoil section 111b and aft of the third and fourth adjacent points 116c, 116d. The second portion has a second width W2 that is greater than or equal to the width of any portion 124 that is forward of the second portion 124b. The first portion 124a is located aft of the second portion 124b and has a first width W1 that is greater than or equal to the second width W2. Accordingly, the first portion 124a is the wide portion of the second fairing section 122b. As discussed above with reference to FIG. 3, it has been discovered that in certain embodiments locating at least part of the wide portion (e.g., the first portion 124a) of the second fairing section 122b aft of the second airfoil section 111b can result in an airflow AF that produces a drag reduction and/or a lift increase over that of airfoils having current fairings.

In the illustrated embodiment, the second portion 124b also includes a first point P1 on the first side S1 and a second point P2 on the second side S2. The first and second points P1, P2 are points of maximum curvature of their respective sides S1, S2 in a streamwise direction (e.g., with respect to the airflow AF and/or with respect to the longitudinal axis L3 of the second fairing 120b). In FIG. 7, the wide portion (e.g., the first portion 124a) includes the first and second points P1, P2, and the first and second points P1, P2 are opposite one another relative to the longitudinal axis L3 of the second fairing 120*b*. In other embodiments, the points of maximum curvature on the first and second sides S1, S2 are not coincidental with the wide portion (e.g., the first portion 124*a*) of the second fairing 120*b*. In still other embodiments, the points of maximum curvature on the first and second sides are not directly opposite one another relative to the longitudinal axis L3 of the second fairing 120*b* (e.g., the points of maximum curvature are on their respective sides, but are not directly opposite one another). In yet other embodiments, only the point of maximum curvature for one of the sides of the second fairing section 122*b* is located aft of the second airfoil section 111*b* and/or aft of at least one of the third and fourth adjacent trailing edge points 116*a*, 116*b*. As discussed above with reference to FIGS. 3-6, in certain embodiments at least a part of the second trailing edge portion 112*b* of the second airfoil section 111*b* is movable to at least two positions and at least one point of maximum curvature is located aft of the second airfoil section 111*b* and/or aft of at least one of the third and fourth adjacent trailing edge points 116*a*, 116*b* when the movable part of the second trailing edge portion 112*b* is in a selected position (e.g., one of the two positions). In still other embodiments, a side of the second fairing section 122*b* can have multiple points with the maximum curvature (e.g., the second fairing section 122*b* can have two points on a side that have the same curvature where that curvature is the maximum curvature on the respective side).

It has been discovered that in certain embodiments locating a point of maximum curvature of at least one of the first or second sides S1, S2 of the second fairing section 122*b* aft of the second airfoil section 111*b* can affect the airflow proximate to the second fairing section 122*b*. This can result in a drag reduction and/or a lift increase over that of airfoils having current fairings. It is thought that one factor contributing to this phenomenon is the placement of a low-pressure area proximate to the trailing edge of the airfoil and the fairing. For example, the airflow tends to accelerate proximate to the point(s) of maximum curvature, thereby reducing the local or static pressure. This reduction in pressure can decrease drag and/or increase lift over that of aircraft with current fairings. An advantage of decreasing drag and/or increasing lift is that aircraft performance can be improved, reducing fuel burn, and thereby increasing range and/or decreasing operating costs over aircraft having current fairings.

In certain embodiments, fairing systems 100 in accordance with aspects of the present invention can be retrofitted on existing aircraft. For example, in selected embodiments the fairing 20 (shown in FIG. 1) mounted on the first airfoil 10*a* of the aircraft 50 can be removed and a fairing similar to the first or second fairing system 100*a*, 100*b* discussed above with reference to FIGS. 2-7 can be mounted to the first airfoil 10*a* of the aircraft 50 shown in FIG. 1. As discussed above, in certain embodiments the drag of the aircraft 50 can be reduced and/or the lift of the aircraft 50 can be increased by replacing the fairing 20 (shown in FIG. 1) with a fairing system 100 in accordance with aspects of the invention.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although aspects of the present invention have been described above with reference to a wing of an aerospace vehicle, in other embodiments fairing systems in accordance with aspects of the invention can include other airfoil surfaces (e.g., a vertical stabilizer or a canard). Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A fairing system, comprising:
an airfoil having a trailing edge and an airfoil section with a trailing edge portion; and
a fairing mounted to the airfoil section, the fairing having a longitudinal axis and a fairing section extending along the longitudinal axis forward and aft of the trailing edge portion of the airfoil section, with the airfoil section corresponding to a planform projection of a segment of the fairing on the airfoil, the fairing section having a wide portion located aft of the airfoil section, the wide portion of the fairing section having a single spanwise width measured perpendicular to the longitudinal axis of the fairing that is greater than a spanwise width of any other portion of the fairing section, wherein the airfoil includes a movable surface and the fairing houses (a) at least a portion of a drive mechanism configured to move the movable surface, (b) at least a portion of one or more supports associated with the movable surface, or (c) both (a) and (b).

2. The system of claim 1 wherein:
the airfoil includes a wing and the movable surface includes a flap surface, the wing being coupled to a fuselage of an aircraft; and
the fairing includes a flap fairing, the flap surface being movable from a retracted position to at least one extended position.

3. The system of claim 1 wherein the airfoil includes an airfoil couplable to an aerospace vehicle.

4. The system of claim 1 wherein:
the airfoil includes one or more adjacent trailing edge points, the one or more adjacent trailing edge points being located on the trailing edge of the airfoil and immediately adjacent to the fairing; and
at least part of the wide portion of the fairing section is located aft of at least one of the one or more adjacent trailing edge points.

5. The system of claim 1 wherein at least a part of the trailing edge portion of the airfoil section is movable between at least two positions and wherein the wide portion of the fairing section is located aft of the airfoil section when the at least a part of the trailing edge portion is in a selected position.

6. The system of claim 1 wherein the fairing section includes a first side and a second side, each side being laterally displaced from the longitudinal axis, each side having a point of maximum curvature, the point of maximum curvature for at least one of the first and second sides being located aft of the airfoil section.

7. The system of claim 1 wherein the fairing section includes at least one of multiple pieces and the entire fairing.

8. The system of claim 1 wherein at least a portion of the fairing is positioned to move when the drive mechanism moves the movable surface.

* * * * *

UNITED STATES PATENT AND TRADEMARK OFFICE
CERTIFICATE OF CORRECTION

PATENT NO. : 7,300,021 B2  Page 1 of 1
APPLICATION NO. : 11/134019
DATED : November 27, 2007
INVENTOR(S) : Voogt It is certified that error appears in the above-identified patent and that said Letters Patent is hereby corrected as shown below:

On Page 3, in field (56), under "Other Publications", in column 2, line 5, delete "%2Baircraft%29" and insert -- %28aircraft%29 --, therefor.

On Page 4, in field (56), under "Other Publications", in column 2, line 29, delete "Aeornautics" and insert -- Aeronautics --, therefor.

Signed and Sealed this

Twelfth Day of August, 2008

JON W. DUDAS
*Director of the United States Patent and Trademark Office*